Feb. 5, 1952 — C. J. OLIVER ET AL — 2,584,283
FASTENING MEANS FOR TELESCOPING TUBULAR MEMBERS
Filed Feb. 25, 1949 — 2 SHEETS—SHEET 2
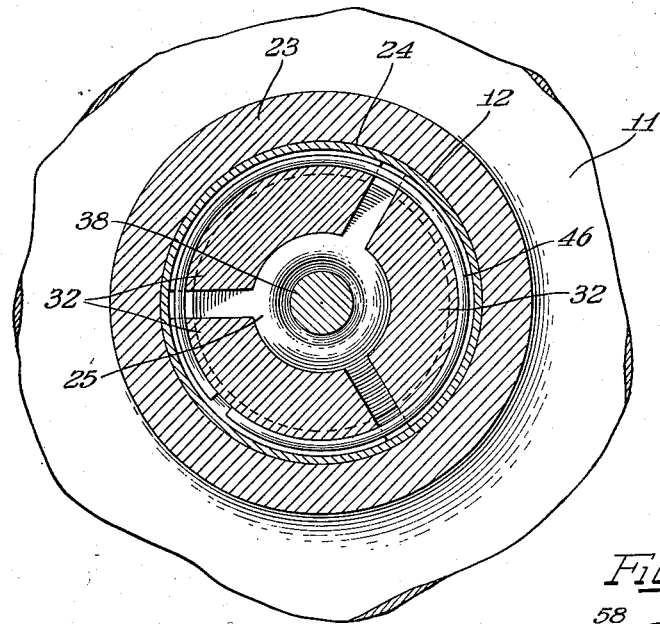
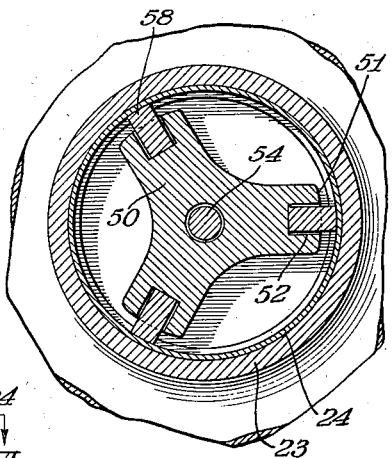
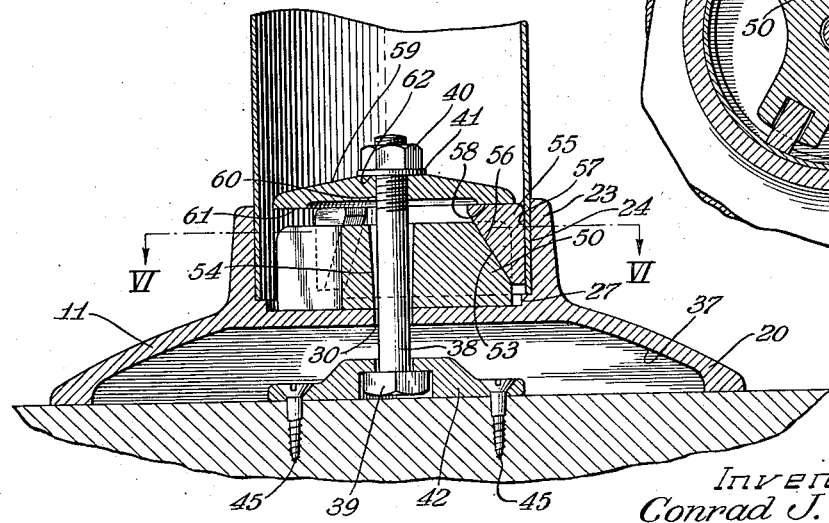
Inventor
Conrad J. Oliver &
Joseph Kupski
by The Firm of Charles W. Hill Attys Patented Feb. 5, 1952

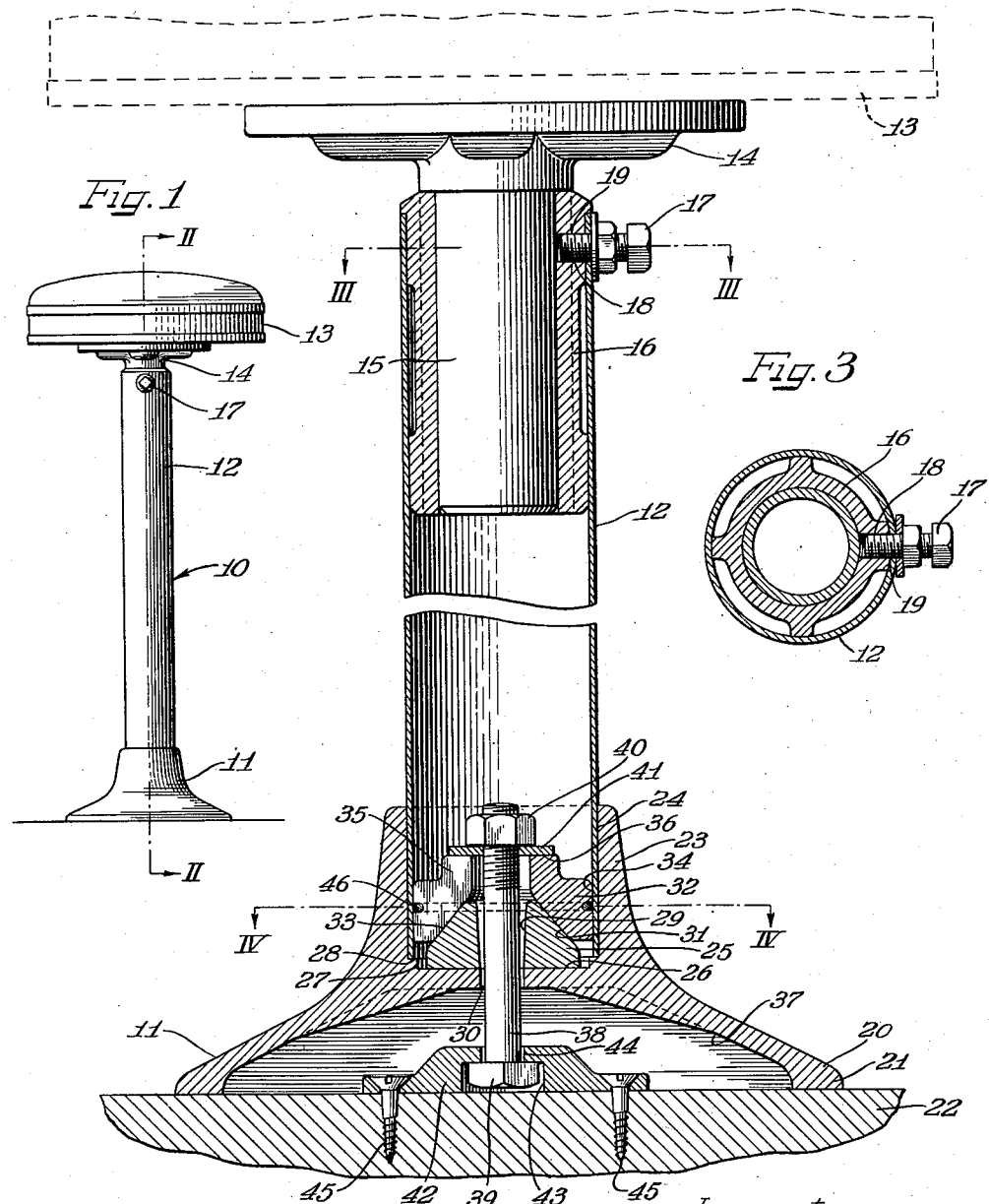

2,584,283

UNITED STATES PATENT OFFICE 2,584,283

FASTENING MEANS FOR TELESCOPING TUBULAR MEMBERS

Conrad J. Oliver, Waukegan, and Joseph Kupski, North Chicago, Ill., assignors to The Chicago Hardware Foundry Company, North Chicago, Ill., a corporation of Illinois Application February 25, 1949, Serial No. 78,343

7 Claims. (Cl. 155—134)

The present invention relates to fastening means for telescoping members and more particularly to fastening means for urging a plurality of telescoping members into peripherally gripping contact to maintain the members in nested relation.

The present invention provides an inexpensive, easily manufactured, and readily adjustable means for securing a pair of telescoping tubular members together in nested relation without the employment of securing means extending externally of the nested members. Tubing of a specified size, as commercially available, may vary in internal and external diameter and in wall thickness within a rather large tolerance. Accordingly, it has previously been necessary to machine such tubing before an accurate frictional, telescopic fit could be obtained.

The disadvantages inherent in the necessity of such machining are well illustrated in the case of the manufacture of stools for soda fountains, counters and the like, in which a tubular post is fitted within a cylindrical recess formed in a base structure to support a seat in spaced relation to the base. Prior to the present invention, it has been necessary in securing the tubular post in position within the base to machine each piece of tubing to correspond to the machined recess within which it is to be fitted, so that the resulting snug engagement will prevent relative movement between the tube and the base. The additional manufacturing expense entailed in the machining of each piece of tubing to exact fit will be evident.

The present invention now provides fastening means for securing telescoping members in nested relation to eliminate relative movement between the tubular members without the necessity of individually machining the nested members. The present fastening means employs unmachined castings which may be produced cheaply and in large quantities.

In general, the fastening means of the present invention comprises a pair of relatively movable wedging members having camming surfaces which are in sliding contact so that, upon relative movement of the two members toward each other, the outer of the members is forced outwardly. When assembled inside the telescoped portions of an inner thin-walled tubular member and an outer member, movement of the wedging members toward each other is sufficient to cause deformation of the inner tubular member into expanded tightly gripping surface contact with the outer of the telescoping members, so that the telescoping members are secured together against relative movement.

The means for forcing the wedging members together upon assembly of the telescoping members may suitably take the form of the bolt and nut which are also adapted to maintain the tubular member and fastening means positioned on the base. Thus, a portion of the fastening means serves to secure together the entire assembly as well as in maintaining a tight, friction fit between the tubular post and the base without the necessity of machining the post.

It is, therefore, an important object of the present invention to provide fastening means for securing telescoping members in nested relation without the necessity of machining the members to insure a tight, friction fit therebetween.

Another important object of the present invention is to provide improved fastening means for securing telescoping members in nested relation by means of a plurality of camming members disposed within the telescoping members and operable against one of the telescoping members for forcing the one member into tight, gripping surface engagement with the other of the members, the fastening means being disposed entirely within the telescoping members.

A further important object of the present invention is to provide a stool including a base, a thin-walled tubular seat post seated within the base, the post and base being secured together by fastening means enclosed within the post and having cooperating camming surfaces serving to deform the post outwardly into tight, gripping surface engagement with the base, the fastening means also serving to secure the base and the post in assembled relation.

It is a still further important object of the present invention to provide anchoring and fastening means for a stool or the like having a base with a cylindrical recess formed therein and a thin-walled tubular post adapted to be seated in the recess the fastening means including a pair of relatively movable camming elements for expanding the post into tight gripping surface engagement with the base to insure a tight, friction fit therebetween.

Other and further important objects of this invention will be apparent from the disclosures in the specification and the accompanying drawings.

On the drawings:

Figure 1 is a side elevational view illustrating a stool of the present invention;

Figure 2 is an enlarged, broken sectional view, with parts shown in elevation taken along the plane II—II of Figure 1.

Figure 3 is a cross-sectional view, with parts shown in elevation, taken along the plane III—III of Figure 2;

Figure 4 is a cross-sectional view, with parts shown in elevation taken along the plane IV—IV of Figure 2;

Figure 5 is a fragmentary cross-sectional view, with parts shown in elevation, similar to Figure 2, and illustrating a modified form of the stool of the present invention; and Figure 6 is a cross-sectional view taken along the plane VI—VI of Figure 5.

As shown on the drawings:

In Figure 1, reference numeral 10 refers generally to a stool of the present invention employing the fastening means hereinbefore described. The stool 10 comprises generally a base 11 and an upwardly extending tubular post 12 seated in the base 11 and carrying a seat 13.

As best shown in Figure 2, the seat 13 is mounted in the tubular post 12 by means of a tripod 14 having a cylindrical shank 15 extending axially into a tripod bushing 16 positioned in the upper end of the post 12. The tripod bushing 16 as may be seen at Figures 2 and 3, is engaged by a set screw 17 threaded into a threaded aperture 18 of the bushing 16 and extending thereinto through a registering aperture 19 formed in the post. The screw 17 may be threaded through recess 18 into engagement with shank 15 to prevent rotation of seat 13 if desired.

Base 11 is provided with a lower, flared collar portion 20 having an angular plane seating surface 21 adapted to be seated upon a suitable supporting structure, such as a floor 22. Base 11 is also provided with an upstanding, central, generally cylindrical embossment 23 which is axially recessed as at 24 to receive that end of post 12 opposite seat 13.

The generally cylindrical boss 23 and the post 12 thus form telescoping outer and inner tubular members, respectively, with the inner member being received in nested relation by the outer member. A cast, generally conical member 25 having a plain circular lower face 26 is bottomed within recess 24. More particularly, surface 26 is bottomed within a second recess 27 of smaller diameter than recess 24 and in full communication therewith to define a shoulder 28 therebetween against which tubular portion 12 is bottomed. The member 25 is axially apertured, as at 29, the aperture 29 being in registery with aperture 30 and axially aligned with recess 24 for purposes to be hereinafter more fully described. The outer frusto conical inclined surface 31 of member 25 provides a camming surface as will be hereinafter more fully described.

As seen in Figures 2 and 4, a plurality of individual, arcuate segments 32 are also provided within that end of tubular portion 12 inserted within recess 24. The segmental members 32 are formed with inclined, inner concave camming surfaces 33 of substantially the same curvature as surface 31 of member 25 and adapted to be brought into contact therewith as shown in Figures 2 and 4. Segments 32 are also provided with outer curved surfaces 33 of substantially the same curvature as the interior periphery of tube 12 and in contact therewith when assembled as shown in Figure 2. The segments 32 are also provided with upstanding integral portion 35 having upper planar surfaces 36.

The lower flared portion of base 11 is provided with an axial recess 37 defining annular seating face 21 and communicating with recess 23 through aperture 30. A bolt 38 is mounted within recess 37 with the shank of the bolt 38 extending centrally through the recess 29 into the post 12 beyond the upper surfaces 36 of segments 32. A nut 40 is threaded onto that end of bolt 38 extending axially into tube 12 and an annular washer 41 is interposed between nut 40 and surfaces 36 to bear thereagainst.

Head 39 of the bolt 38 is secured within a circular mounting plate 42 having a central cylindrical recess 43 receiving head 39 and a second concentric aperture 44 receiving that portion of shank of bolt 38 immediately adjacent the head 39. The plate 42 is secured to the floor 22 by suitable means, as by screws 45.

In assembling the stool 10 and securing it to the floor 22, the following procedure may be followed: The mounting plate 42 is secured to the floor 22 by means of the screws 45 with the head of bolt 44 being positioned within the recess 43, the shank of bolt 38 extending upwardly beyond the plate. The base 11 is next positioned centrally over plate 42 with the shank of bolt 38 extending through aperture 30 into the recess 24 of the boss 23. Next, the cone 25 is slipped over the shank of bolt 38 and is bottomed against the lower surfaces 26 of recess 24. Segments 32 are next positioned on the cone 25, the segments 32, if desired, being held against the camming surface 31 of cone 25 by means of an annular wire snap ring 46. Next, washer 41 and nut 40 are assembled to overlie segments 32 and tube 12 is inserted in the base 11 over the assembled fastening means to be seated on shoulder 28 of recess 23.

Next, a long shanked socket wrench, or similar instrument is inserted through tube 12 to tighten bolt 40, forcing the camming surfaces 33 of the segments 32 into tight surface engagement with the camming surfaces 31 of the cone 25. By this camming action, the outside surfaces 34 of the segments 32 are cammed into tightly gripping surface engagement with the interior surfaces of that portion of the tube 12 within recess 23 to force the tube outwardly into tight surface engagement with the walls of recess 24. When the nut 40 has been tightened sufficiently to obtain tight gripping engagement between the tube and the recess walls, the seat 13 is positioned within tube 12 with the boss 15 extending into the tripod collar 16. Thus, the seat may be easily and readily secured to the tube 12 which in turn is firmly secured within the base 11.

In the modified form of the present invention as shown at Figures 5 and 6 of the drawings, identical reference numerals refer to identical portions of the assembly as shown in Figures 1-4. In this modification of the invention, the cone 25 is replaced with a generally triangular spider 50 having peripherally spaced legs terminating in arcuate end walls 51 (Figure 6) extending into closely spaced relation to the curved interior wall 24 of the base embossment 23. The walls 51 are recessed as at 52 to define an inclined camming surface 53 extending at an angle to the walls 23. The spider 50 is axially apertured as at 54 to receive the shank of the bolt 38, therethrough the aperture 54 registering with central aperture 30 of base 20.

A plurality of sliding leaves 55 are provided, one of the leaves 55 being dimensioned to be slidingly received by each of the inclined grooves 52 formed in each arcuate face 51 of the spider 50. The leaves 55 are generally triangular in configuration, each leaf having one inclined interior camming surface 56 for contacting the inclined surface 53 of spider 50. The leaves 55 are also each provided with an exterior surface 57 adapted for contacting the interior periphery of tube 12 and an upper plane surface 58 extending above spider 50. A circular washer 59, axially apertured as at 60 to receive bolt 38, is provided with a lower annular peripheral surface 61 for contacting surface 58 of leaves 55, the upper surface 62 of washer 59 being adapted to receive washer 41 urged thereagainst by nut 40.

The assembly of the stool of the present invention employing the fastening means illustrated in Figures 5 and 6 is substantially identical with that hereinbefore described. The spider 50 is positioned within the recess 24, the leaves 55 are positioned with their inner camming faces 56 contacting the faces 53 of spider 50 and the washer 59 is positioned over the leaves with its lower surface 61 in contact with the upper surfaces 58 thereof. Following assembly of the tube 12 about the fastening means, the tube is secured within the embossment 23 by forcing the washer 59 downwardly by tightening nut 40 on bolt 38, thus camming the leaves downwardly into tight gripping engagement with the interior of the tube.

It will readily be seen that if desired, a wire snap ring similar to the ring 46 hereinbefore described in connection with Figures 1-4, inclusive, may also be employed with this modified form of the invention.

It will, of course, be understood that various details of construction may be varied through a wide range without departing from the principles of this invention, and it is, therefore, not the purpose to limit the patent granted hereon otherwise than necessitated by the scope of the appended claims.

We claim as our invention:

1. Fastening means for securing a thin-walled tubular member to a base having an upper cylindrical open-topped recess comprising an inner, wedge member seated within said recess and having a conical camming face extending into one end of said tubular member when inserted within said recess, a plurality of segmental outer wedge members each having an inner inclined camming face for sliding contact with said conical camming face and an outer portion for contacting the inner peripheral surface of said tubular member, and means projecting upwardly through said base into said recess for retaining said inner member in seated position in said recess and for urging said outer wedge members downwardly toward said inner member for camming radial movement, whereby said outer members are displaced outwardly to deform said tubular member outwardly into engagement with the interior surfaces of said recess.

2. In a stool, a base with an upper cylindrical recess formed therein, a tubular thin-walled post having an open end seated in the recess, means for securing the post to the base comprising a first member bottomed in said recess and having outer camming surfaces extending into said open end of said tube, a second member disposed within said tube and having interior surfaces in engagement with said outer camming surfaces and an outer curved surface in engagement with the wall of said tube end and a bolt extending through said members and serving upon being tightened to urge said second member downwardly along the camming surfaces of said first member and to retain said first member in bottomed relation within said recess, whereby said outer curved surfaces of said member is caused to deform the thin wall of said post outwardly into gripping engagement with said base.

3. In a stool, a base with a cylindrical recess formed therein, a tubular post seated in said recess, means for securing the post to the base comprising a first member bottomed in said recess and having an outer conical camming surface extending into said post, a plurality of segments having interior inclined camming surfaces contacting the conical camming surface of said first member and exterior surfaces mating with and contacting the inner periphery of said post, and means acting directly on each of said segments to urge the same downwardly within said recess along the conical surface of said first member to urge said segments outwardly into tight gripping engagement with the inner periphery of said post and to deform said post outwardly into tight gripping surface contact with said base.

4. In a stool, a base with a cylindrical recess formed therein, a tubular post seated in said recess, means for securing the post to the base comprising a spider mounted in said recess and having arcuate walls extending into spaced relation with the interior surfaces of said post, said spider walls having recesses formed therein defining inclined camming surfaces, wedges seated in said recesses of said spider and having inclined camming surfaces in sliding contact with the spider camming surfaces and outer contacting surfaces in surface engagement with the inner periphery of said post, and means carried by the base and extending into said recess for contacting said wedges to urge the same along said spider camming surfaces forcing said wedges outwardly into expanded engagement with the interior surfaces of said post to deform the post outwardly into surface engagement with the walls of said recess.

5. In a stool, a base having a lower interior recess and an upper cylindrical recess formed therein, a tubular member extending into said upper cylindrical recess and seated therein, a spider having radial legs extending into spaced relation to the inner peripheral surface of said tubular member and having recesses formed in the legs to define inclined camming surfaces, a plurality of leaves slidably seated in said recesses and having inclined camming surfaces contacting the camming surfaces of said legs, and fastening means for securing said base to a supporting surface and said tubular member within said upper cylindrical recess, including a bolt having its head positioned within the lower interior recess of said base and its shank projecting into said cylindrical recess and that portion of said tubular member therein, and means carried by said shank and contacting said leaves for causing movement of said leaves relative to said spider with said camming surfaces in contact, whereby said leaves are moved outwardly into surface engagement with the interior peripheral surface of said tubular member to deform the tubular member against the interior surface of said upper cylindrical recess.

6. In a stool, a base having a lower interior recess and an upper cylindrical recess therein, a tubular post seated in said upper cylindrical recess, and means for securing said post to said base and said base to a supporting surface comprising a first member bottomed in said upper cylindrical recess and having an outer inclined camming face extending into that end of said post seated in said upper cylindrical recess, a plurality of additional members positioned between said first member and the interior periphery of said post and having inclined camming surfaces in engagement with the camming surfaces of said first member and outer curved contacting surfaces in contact with the inner wall of said post, and securing means secured to said supporting surface within said lower base recess and projecting therefrom into said cylindrical recess to act directly on said additional members for urging said members toward said first member, whereby movement along said inclined camming surfaces forces said additional members to move outwardly and to deform the post wall outwardly into gripping engagement with the interior peripheral wall of said upper cylindrical recess of said base.

7. In a stool, a base having a lower interior recess and an upper cylindrical recess, a tubular post seated in said upper cylindrical recess, and means for securing said post within said upper recess and said base to a supporting surface including a first wedge member for insertion into the tubular post and having an outer inclined camming surface, a second wedge member adapted to fit said first wedge member and having an inclined camming surface contacting the camming surface of said first wedge member, and fastening means secured to the supporting surface within the lower recess of said base and projecting through the base into the upper recess thereof for urging said members together with said camming surfaces in sliding contact to urge said second wedge member against the tubular post to deform the same outwardly into surface engagement with the walls of said upper recess and to bottom said first member within said upper recess to secure said base to said supporting surface.

CONRAD J. OLIVER.
JOSEPH KUPSKI.

REFERENCES CITED

The following references are of record in the file of this patent:

UNITED STATES PATENTS

| Number | Name | Date |
|---|---|---|
| 432,278 | Maschmeyer | July 15, 1890 |
| 461,238 | Cox | Oct. 13, 1891 |
| 649,785 | Weinert | May 15, 1900 |